United States Patent [19]

Condon et al.

[11] 4,341,398
[45] Jul. 27, 1982

[54] SYSTEM FOR CONTROLLING THE KNEELING OPERATION OF AIR SUSPENSION EQUIPPED TRANSIT VEHICLES

[75] Inventors: James E. Condon, Woodland, Calif.; Carl W. Roth, Barrington; Ralph A. Gritchen, Skokie, both of Ill.

[73] Assignee: Vapor Corporation, Chicago, Ill.

[21] Appl. No.: 189,177

[22] Filed: Sep. 22, 1980

[51] Int. Cl.³ .............................................. B60G 11/26
[52] U.S. Cl. ..................................... 280/711; 296/178
[58] Field of Search ............ 280/702, 711, 166, 43.23; 296/178; 414/469, 474

[56] References Cited

U.S. PATENT DOCUMENTS

| | | | |
|---|---|---|---|
| 2,691,420 | 10/1954 | Fox | 280/711 |
| 3,917,307 | 11/1975 | Shoebridge | 280/702 |
| 4,180,366 | 12/1979 | Roth | 280/166 |
| 4,213,625 | 7/1980 | Hagen | 280/711 |
| 4,248,455 | 2/1981 | Manning | 280/711 |

*Primary Examiner*—Richard A. Bertsch
*Assistant Examiner*—John A. Carroll
*Attorney, Agent, or Firm*—Francis J. Lidd

[57] ABSTRACT

A system for controlling the kneeling operation of air suspension equipped transit vehicles includes air suspension members (20, 22, 24, 26, 28, 30) mounted at the wheels of the transit vehicle (10) and a fluid reservoir (32). A fluid circuit is included that communicates the reservoir with each of the air suspension members. An exhaust control valve (36) and a fluid flow control valve (150) are included in the circuit at each air suspension member. The system also includes a control valve for the front wheels of the vehicle and a by-pass valve (162) for by-passing the control valve (40) for the front wheels.

1 Claim, 2 Drawing Figures

SYSTEM FOR CONTROLLING THE KNEELING OPERATION OF AIR SUSPENSION EQUIPPED TRANSIT VEHICLES

BACKGROUND OF THE INVENTION

A. Field of the Invention

The present invention generally relates to a new and improved system for controlling the kneeling operation on air suspension equipped transit vehicles such as buses.

B. Description of the Prior Art

One prior art means of assisting boarding by the elderly and handicapped onto transit vehicles such as buses, is to equip the transit vehicles with a system to allow the bus to kneel. The bus includes a driver activated kneeling system that lowers the front step height by releasing air from the front suspension air bags.

Although this system is satisfactory on transit vehicles without lifts, such a feature creates a problem on lift equipped vehicles of the type disclosed in U.S. Pat. No. 4,180,366, hereby fully incorporated by reference. For example, on high crowned roads, kneeling systems that activate only the front suspension element adjacent the door increases the transverse attitude of the vehicle beyond that due to the crown of the road thereby increasing the difficulty of obtaining a proper lift to curb interface and of maneuvering a wheel chair, for example, onto the lift and into the bus. Deploying the lift with prior art kneeling systems results in non uniform contact between lift extremities and the street surface, resulting in damage to the lift and/or difficulty in loading. For these reasons, most prior art kneeling systems do not permit simultaneous use of the lift and of the kneeling feature. It is desirable, therefore, to provide a system for controlling the kneeling of lift equipped transit vehicles.

SUMMARY OF THE INVENTION

An object of the present invention is to provide a new and improved system for controlling the kneeling operation on air suspension equipped transit vehicles.

Another object of the present invention is to provide a new and improved system for controlling the kneeling operation of air suspension equipped transit vehicles to allow the front of the vehicle to be maintained level in the transverse direction during the lowering and raising of the front end.

A further object of the present invention is to provide a new and improved system for controlling the kneeling operation on air suspension equipped transit vehicles that is added on to the existing system and is operable by the operator of the vehicle.

The present invention is directed to a new and improved system for controlling the kneeling operation on air suspension elements mounted on the vehicle adjacent the wheels of the vehicle. The system includes a reservoir of fluid such as air and a fluid circuit communicating the reservoir to each of the air suspension elements. The circuit also includes flow control and exhaust control valves at each air suspension element as well as a front flow control valve for controlling air flow to the suspension elements adjacent the front wheels of the transit vehicle. A by-pass valve by-passing the front flow control valve is also included.

The system may be manually controlled by the driver of the transit vehicle to kneel the left front portion of the bus prior to lowering the lift to the curb at the same time maintaining the transit vehicle level in the transverse direction.

BRIEF DESCRIPTION OF THE DRAWING

The above and other objects and advantages and novel features of the present invention will become apparent from the following detailed description of a preferred embodiment of the invention illustrating in the accompanying drawing wherein.

DESCRIPTION OF THE PREFERRED EMBODIMENT

Figure 1:
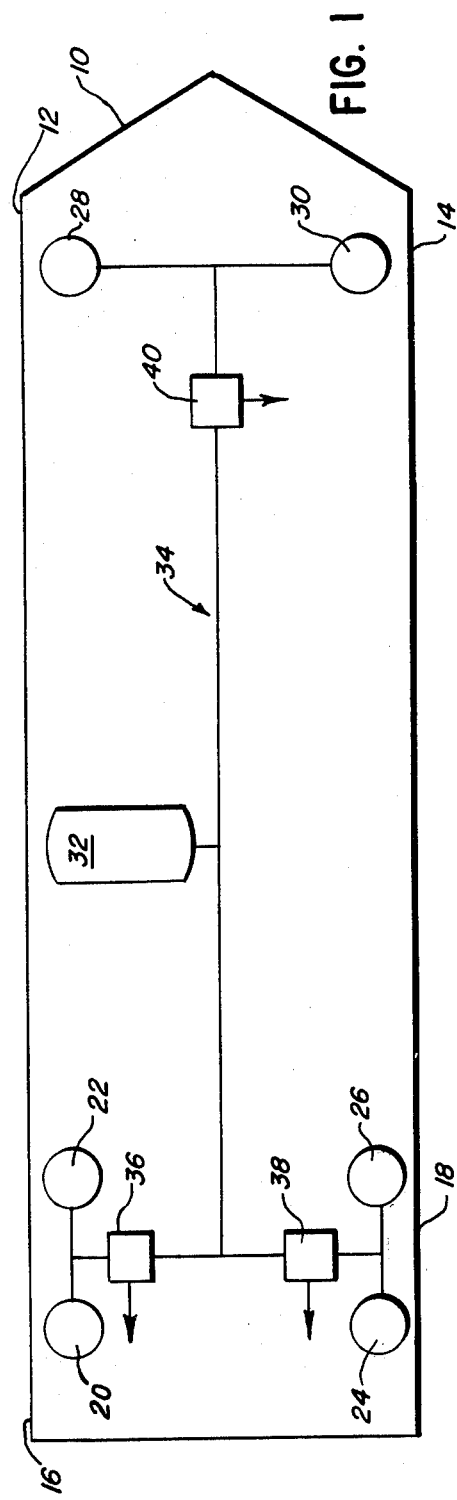
FIG. 1 is a schematic illustration of a typical height control system for maintaining normal ride height incorporated in many transit vehicles.

Referring initially to FIG. 1, of the drawings, there is schematically illustrated a standard kneeling control system employed on transit vehicles including air suspension elements such as air bags. More specifically, a transit vehicle 10 is schematically illustrated and includes locations 12 and 14 at which the front wheels of the vehicle are located and locations 16 and 18 where the rear wheels of the vehicle are located. Air suspension elements or air bags 20 and 22 are schematically illustrated as mounted to the frame of the vehicle 10 adjacent the rear wheel 16 and air suspension elements or bags 24 and 26 are schematically illustrated as mounted on the frame adjacent to the rear wheel 18. In addition, air suspension element or air bag 28 is schematically illustrated as mounted on the frame adjacent to the left front wheel 12 and air bag or air suspension element 30 is illustrated as mounted on the frame adjacent to the right front wheel 14.

The air bags 20, 22, 24, 26, 28 and 30 are in fluid communication with a pressurized fluid or air reservoir 32 by a fluid circuit generally designated by the reference numeral 34. In the fluid circuit 34 at the left rear air bags 20 and 22 there is included a height control 36 valve. A similar height control valve 38 is included in the fluid circuit 34 in line with the air bags 24 and 26. The height control valves 36 and 38 may be actuated to admit or exhaust fluid from the air bags 20, 22 and 24, 26 to raise or lower the height of the vehicle 10 adjacent the respective wheels. Action of 36 and 38 is normally used to control the bus body height in normal operation.

A front height control valve 40 is also included in the fluid circuit 34 at a location to control the exhaust of fluid from the front air bags 28 and 30. Accordingly, the entire front end as opposed to a selective wheel, is lowered by actuation of the front height valve 40 in the system illustrated in FIG. 1. The system illustrated in FIG. 1 is typical of certain systems included with prior art transit vehicles.

Figure 2:
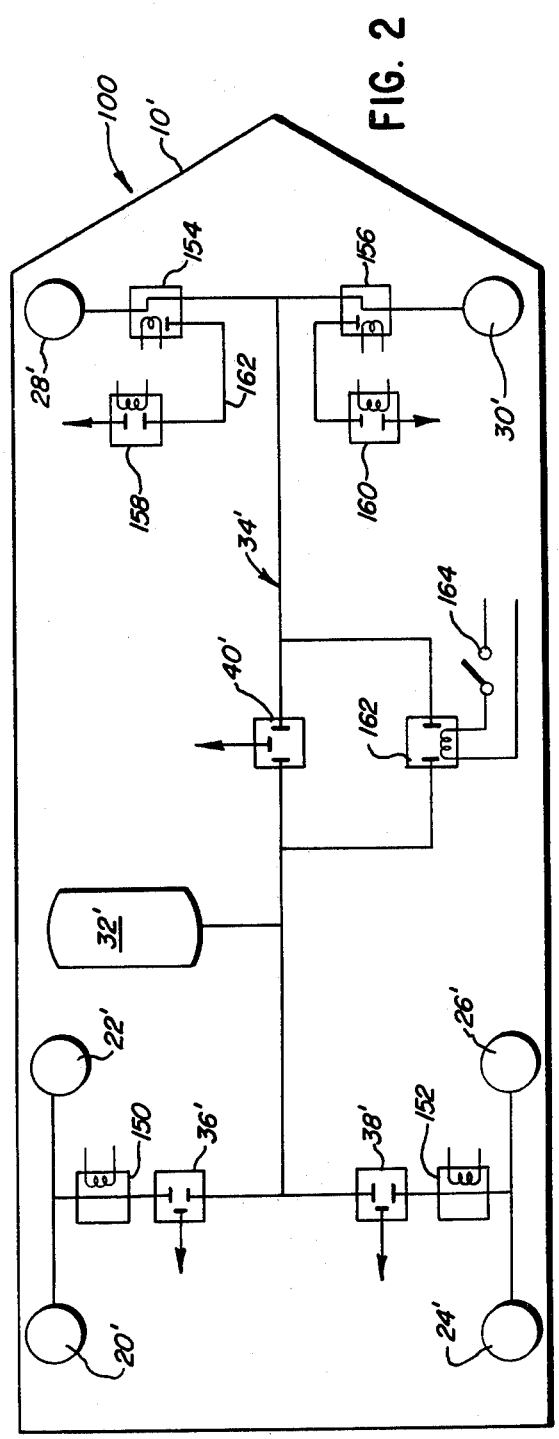
FIG. 2 is a schematic illustration of a standard system of the type illustrated in FIG. 1 with an add-on system constructed in accordance with the principles of the present invention.

In order to modify the typical prior art system such as that illustrated in FIG. 1, to control the kneeling action of transit vehicles that include lifts so that the front of the transit vehicle will be maintained level in the transverse direction, the system of the present invention generally designated by the reference numeral 100 and illustrated in FIG. 2, is added to the standard system illustrated in FIG. 1. The system 100 controls the kneeling operation of an air suspension equipped transit vehicle and maintains the vehicle level in the transverse direction through the selective release of air from the air suspension members of the system.

More specifically, as illustrated in FIG. 2, elements bearing the same reference numerals as in FIG. 1 with the addition of a prime are identical to the elements illustrated in FIG. 1. For example, as in the system illustrated in FIG. 1, the system 100 includes rear air suspension bags 20', 22', 24' and 26' and front air suspension bags 28' and 30' and a fluid reservoir 32' is also included in the fluid circuit 34'. Moreover, rear height control valves 36' and 38' are included in the circuit 34' as well as a front height control valve 40'.

The circuit 100 of the present invention further includes solenoid controlled air valves 150 and 152 in the fluid circuit 34' between the rear height control valves 36' and 38' and the respective air bags they control. Similarly, solenoid controlled air valves 154 and 156 are included in the fluid circuit 34' between the front height control valve 40' and the left 28' and right 30' air bags, respectively. The system 100 also includes controlled exhaust control valves 158 and 160 that are connected to the exhaust ports of the solenoid control valves 154 and 156, respectively, to allow selective exhaust of the individual suspension elements 28' and 30'.

The system 100 of the present invention also includes a solenoid actuated by-pass valve 162 that is mounted in the fluid circuit 34' and functions to by-pass the front height control valve 40'. In normal operation wherein the conventional control system controls bus body riding level, valves 40 and 40' are actuated by a height control switch (not shown) which senses body distance from a pre-selected location on the bus frame. Valve 162 incorporates larger flow capacity than valve 40, providing a rapid return to normal level control made when termination of a kneeling operation is desired. Actuation of the by-pass valve 162 is controlled by a kneel sensing switch 164 that may be a mercury tube unit or a more sophisticated optical sensing device.

The kneeling operation of the standard system illustrated in FIG. 1, is accomplished by exhausting the air bags 28 and 30 and thereby dropping or kneeling the front end of the vehicle 10. In addition, the rear bags 20 and 22 or 24 and 26 or all four can be exhausted kneeling the one side or the other or both sides of the vehicle 10. As previously mentioned, however, transit vehicles that include lifts experience difficulties such as increasing the transverse slope of the floor of the vehicle, lift to curb interface and maneuvering a wheel chair up the increased transverse slope. To overcome these problems the system 100 of the present invention allows the driver of the transit vehicle 10' to control the exhaust of each air bag included in this system and to kneel the bus in a manner to maintain a normal transverse slope and reduce the interface of the lift with a curb. Although the system disclosed is driver controlled, i.e., the proper transverse attitude of the bus is determined by driver actuation of predetermined exhaust valves, those skilled in the art will readily understand that automatic control could readily be incorporated. Use of level sensing switches controlling selected exhaust valves would provide a self leveling system when in the kneeling mode.

More specifically, the operation of the system 100 is as follows: In the normal suspension position, the air bags 20', 22', 24', 26', 28' and 30' are all completely filled and held in this configuration by maintaining the height control valves 36', 38', and 40' and the by-pass valve 162 in the closed or blocked condition. In this condition, pressurized fluid from the reservoir 32' to the rear height control valves 36' and 38' and the front height control valve 40'.

Once the vehicle 10' is pulled to a location to load or unload passengers, the driver may start the kneeling operation of the vehicle 10. For example, if it is desired to commence a left front kneel of the vehicle 10', the rear height control valves 36' and 38' are actuated to block fluid flow to the air bags 20', 22', 24' and 26' but fluid from the air bags 20' and 22' is allowed to flow through the valve 150 to the exhaust port of the rear height control valve 36', thereby allowing the exhaust of air bags 20' and 22'. In a similar manner, the valves 38' and 152 are actuated so that although pressurized fluid from the reservoir 32' through the fluid circuit 34' is blocked, exhaust flow from the air bags 24' and 26' through the valves 152 and 38' to the atmosphere is allowed thereby beginning the reduction of air pressure in the air bags 24' and 26'. Also, the exhaust valve 158 and the solenoid air valve 154 are actuated to exhaust the air bag 28' at the left front wheel of the vehicle 10'. More specifically, the port of the valve 154 in fluid communication with the conduit 166 is opened thereby allowing flow from the air bag 28' through the valve 154 to the conduit 162 and to the exhaust control valve 158.

During the commencement of the kneeling of the vehicle 10', the front height control valve 40' is blocked preventing flow from the reservoir 32'. The kneeling operation continues until the left front of the vehicle 10' is kneeled or lowered a sufficient distance. The height control valve 40' is then actuated to an open position by a level sensing device (not illustrated) allowing pressurized fluid to flow from the reservoir 32' through the fluid circuit 34' to the solenoid controlled air valves 154 and 156. The valves 154 and 156 are in the block condition, however, and prevent further flow of pressurized fluid and the kneeling of the left front and rear of the vehicle 10' continues.

Once the drive of the vehicle 10' determines that sufficient kneeling has occurred, this operation is terminated by the driver by blocking the valves 36', 38', 154 and 156 thus, terminating the exhaustion of the air bags 21', 22', 24', 26', and 28'. Thereafter, the passengers may be loaded and unloaded without the interference problems, or large transverse slope or the curb interference problems typically created by prior art systems.

Once the loading and unloading is completed, the driver may then reactivate the system 100 to raise the left front portion of the vehicle 10' to the normal level. Upon actuation by the driver, the solenoid air valve 154 is energized to a position to block the flow of fluid through the conduit 166 and to communicate the air bag 28' with the fluid circuit 34' through the front height control valve 40'. In addition, the valves 150, 36', 152 and 38' are also opened to positions to block the exhaust passages and connect the air bags 20', 22', 24' and 26' through the fluid circuit 34'. Simultaneously, the kneel sense switch 164 is closed due to the kneeling condition thereby opening the by-pass valve 162 and allowing flow from the reservoir 32' through the valve 162 to the air bag 28'.

The raising condition continues until the near normal rise height whereupon the kneel sense switch 164 is opened thereby closing the by-pass valve 162. Pressurized fluid from the reservoir 32' continues to pass through the front height control valve 40', trimming out the level of the left front of the vehicle 10' to the normal position. Bus level control is now operating in the normal height control mode, i.e, switch 166 controls valve 162 through contact with the frame.

Many modifications and variations of the present invention are possible in light of the above teachings. Thus, it is to be understood that, within the scope of the appended claims, the invention may be practiced other than as specifically described.

What is claimed and desired to be secured by Letters Patent of the United States is:

1. A system for controlling the kneeling operation of a transit vehicle to be added to a standard kneeling control system wherein said transit vehicle includes a frame and first and second sets of rear wheels and first and second sets of front wheels, and said standard system includes a reservoir of pressurized fluid, fluid filled suspension members mounted at each said set of said front and said rear wheels, a fluid circuit coupling each suspension member with said reservoir, first and second rear height control valves in said circuit for controlling fluid flow to and from said suspension members mounted at said first and second sets of rear wheels, respectively; a front height control valve in said fluid circuit for controlling fluid flow to said suspension members mounted at said first and second sets of front wheels; said added on system comprising first and second solenoid controlled air valves in said fluid circuit at said first and second sets of front wheels; first and second solenoid controlled air valves in said fluid circuit at said first and second sets of rear wheels for controlling flow to said suspension members, third and fourth solenoid controlled air valves in said fluid circuit at said first and second sets of front wheels, first and second exhaust control valves coupled to said third and fourth solenoid controlled valves, a by-pass valve in said fluid circuit for by-passing fluid around said front height control valve, and kneel sensing switch means for controlling the actuation of said by-pass valve.

* * * * *